Feb. 1, 1927.
H. D. FLEGEL
1,615,939
ICE CREAM DISHER
Filed June 17, 1925     2 Sheets-Sheet 1
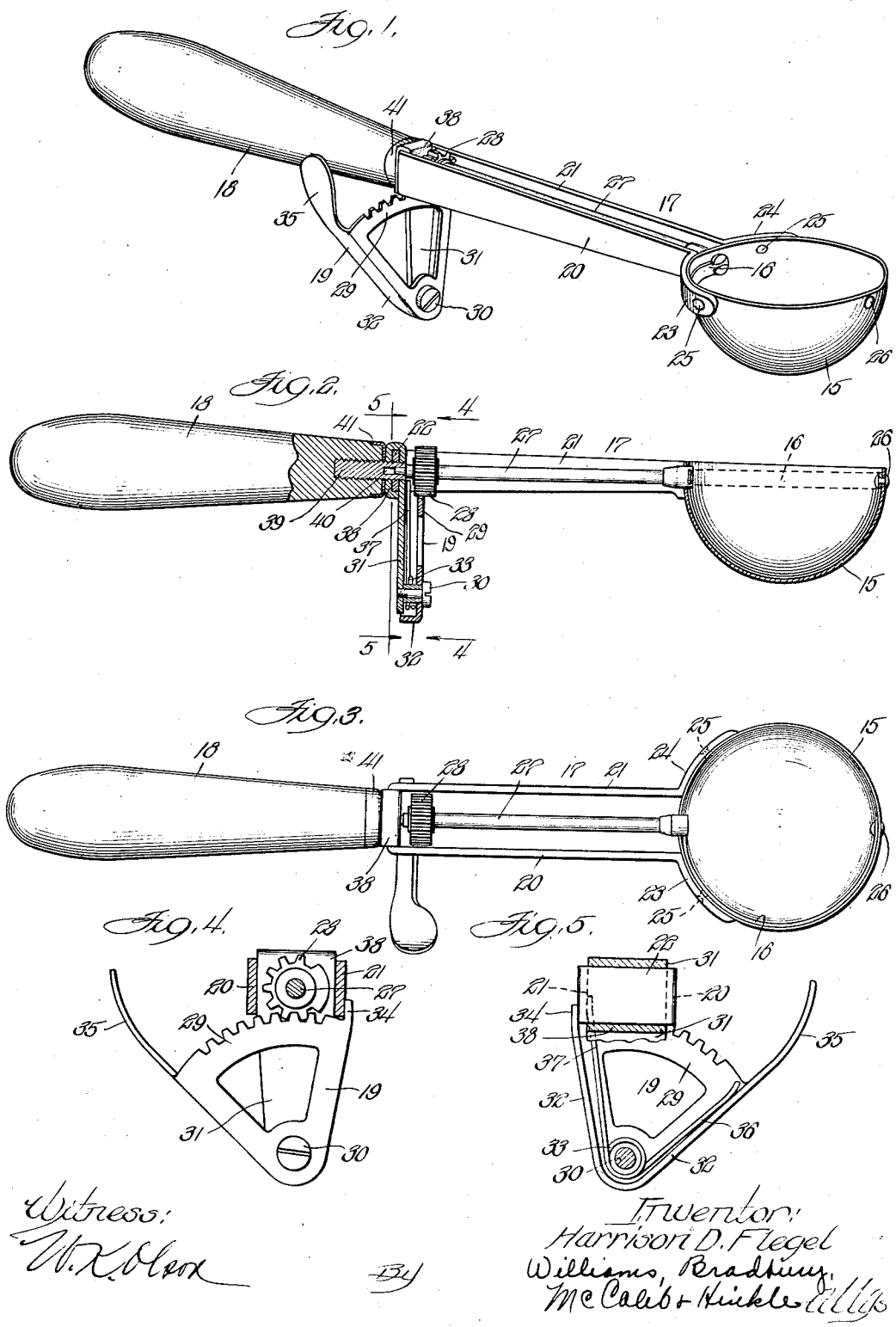

Feb. 1, 1927.
H. D. FLEGEL
ICE CREAM DISHER
Filed June 17, 1925    2 Sheets-Sheet 2
1,615,939
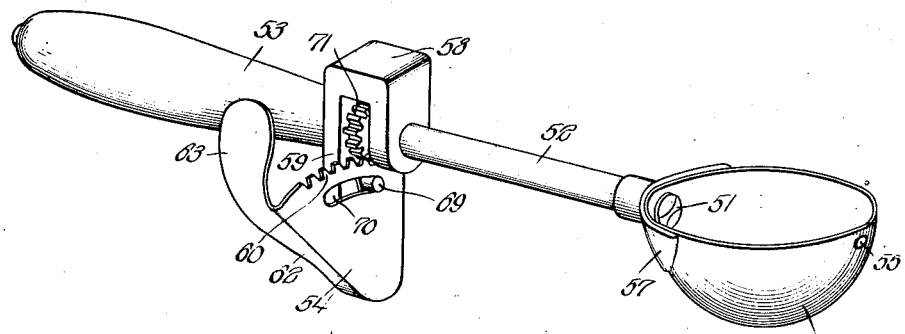
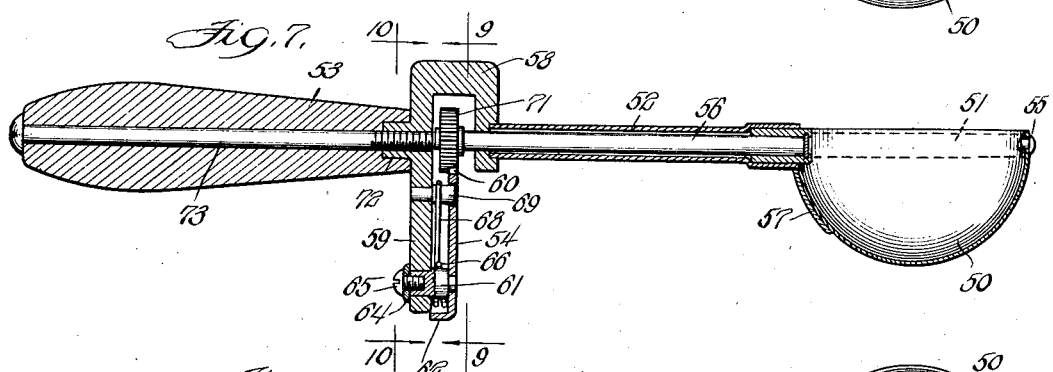
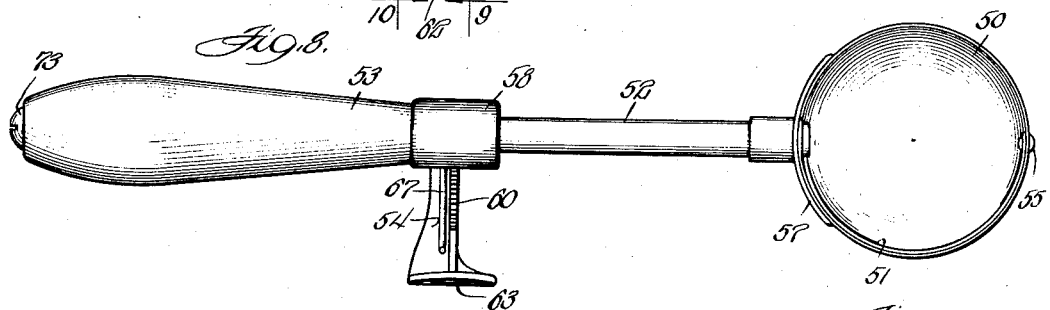
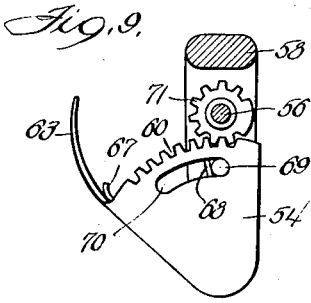
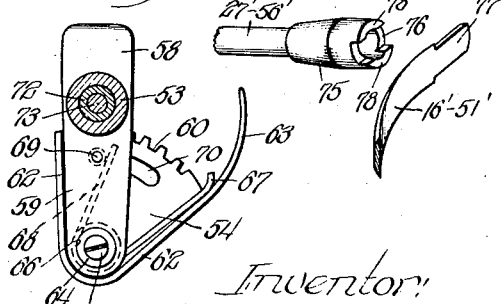
Inventor:
Harrison D. Flegel
By Williams, Bradbury,
McColeb + Hinkle Attys Patented Feb. 1, 1927.

1,615,939

UNITED STATES PATENT OFFICE.

HARRISON D. FLEGEL, OF RACINE, WISCONSIN, ASSIGNOR TO ARNOLD ELECTRIC COMPANY, OF RACINE, WISCONSIN, A CORPORATION OF WISCONSIN.

ICE-CREAM DISHER.

Application filed June 17, 1925. Serial No. 37,619.

This invention relates to ice cream dishers.

One of the objects of the invention is to provide an improved ice cream disher.

Another object is to provide a disher which readily may be kept clean and sanitary.

Another object is to provide a disher which is relatively easy to operate.

Another object is to provide a disher which may withstand severe service.

Another object is to provide a disher which is light and strong.

Another object is to provide a disher which is relatively inexpensive to make.

Another object is to provide a disher which can be forced into hard ice cream with relative ease.

Other objects and advantages will hereinafter appear.

Embodiments of the invention are illustrated in the accompanying drawings, wherein—

Fig. 1 is a perspective of the preferred construction of the disher;

Fig. 2 is a longitudinal section of the preferred construction;

Fig. 3 is a top plan thereof;

Fig. 4 is a section on the line 4—4 of Fig. 2;

Fig. 5 is a section on the line 5—5 of Fig. 2;

Fig. 6 is a perspective of a modified construction of the disher;

Fig. 7 is a longitudinal section of the modified construction.

Fig. 8 is a top plan thereof;

Fig. 9 is a section on the line 9—9 of Fig. 7,

Fig. 10 is a section on the line 10—10 of Fig. 7, and

Fig. 11 is a separated perspective to illustrate the method of joining the scraper to its operating shaft.

The disher has a substantially hemispherical metal bowl 15 within which a curved scraper 16 is adapted to move so as to free the ice cream therefrom. The bowl is rigidly secured to a handle which includes a supporting frame-section 17 and a handgrip-section 18. Scraper 16 is moved by the operator manipulating an operating lever 19.

Supporting frame 17 is formed somewhat in the shape of an elongated U or hair pin having two substantially parallel legs 20 and 21 interconnected at their rear ends by a yoke or base 22. The forward ends of legs 20 and 21 extend outwardly and are curved to form feet 23 and 24 respectively. These feet embrace portions of the bowl adjacent its rim and may be secured thereto by suitable means such as solder, re-enforced if desired by rivets or spot welds 25. The entire supporting frame may be formed from a single piece of sheet metal stamped and bent to the desired shape. This type of construction not only provides an open and easily cleaned structure, but one which is inexpensively produced, plated and polished or otherwise given the desired finish. It is also rigid and strong although of relatively light weight.

The forward or outer end of scraper 16 has a rivet 26 secured thereto. This rivet passes loosely through a hole in bowl 15 and, being upset or headed on the outside, provides a pivot for the outer end of the scraper and also prevents it from being removed. The inner or rear end of scraper 16 is rigidly secured to an operating shaft 27 which passes loosely through a hole in bowl 15 diametrically opposite the hole for rivet 26. The bowl thus provides bearings for the scraper and the outer end of shaft 27. The rotation of shaft 27 turns the scraper to cut or loosen the ice cream from the inside of the bowl.

Shaft 27 extends through frame 17 between and parallel to legs 20 and 21 and near its rear end a small pinion 28 is rigidly secured thereto. Pinion 28 is rotated by operating lever 19 as will be hereinafter described. By making legs 20 and 21 of the bowl supporting frame of sufficient depth, their edges will project well beyond the surface of shaft 27 as shown most clearly in Fig. 2, and protect the same against injury. This feature is of importance because it is common practice for operators to strike or pound the handle of a disher upon some solid object, such as the edge of an ice cream can, while cleaning the same or freeing it from excess ice cream. Consequently if the shaft is exposed, it may become bent or otherwise damaged when subjected to such treatment and the ease of operation may be greatly impaired. In a similar manner the legs of the frame afford protection for the shaft pinion.

Also, since the greater dimensions of the frame legs are in the direction of the maximum strains during the dishing operations, these legs act like channel irons to withstand the forces which tend to bend and buckle them.

Operating lever 19 is formed substantially in the shape of a triangle, the base of which is closed by a curved rack 29. The teeth of rack 29 mesh with the teeth of pinion 28. Near its apex lever 19 is provided with a projecting boss or bearing lug through which a screw 30 passes to pivotally attach the lever to a bracket 31. Bracket 31 is rigidly secured to and projects at substantially a right angle from the handle. The edge of lever 19 is bent to form a flange 32 which constitutes a housing for a biasing spring 33. One end of flange 32 is extended beyond rack 29 to form a lug 34 which engages leg 21 to limit the movement of the operating lever in one direction. The other end of flange 32 is extended and broadened out to form a thumb piece 35 by means of which the operator may actuate the lever with the thumb of the hand grasping the grip of the disher. Thumb piece 35 engaging leg 20, limits the movement of lever 19 in the reverse direction.

Spring 33 has its central portion bent into a loop to encircle the bearing lug of lever 19, one of its legs 36 lying within and against flange 32. The other leg 37 of spring 33 abuts the inside of frame leg 21 as most clearly shown in Figs. 2 and 5. Thus the actuation of lever 19 in one direction (to the right as viewed in Figs. 1 and 4, or to the left as viewed in Fig. 5) serves to tension the biasing spring so that when the operating lever is released the spring returns the operating lever shaft and scraper to normal position. This construction permits the use of a relatively long spring and, since it acts mainly like a leaf spring instead of a coil spring, it will withstand severe service. The principal function of the loop is to hold the spring in place rather than to give the desired resiliency.

Both the operating lever and its supporting bracket may be made of sheet metal, each stamped and formed from a single piece. The lever may be made in skeleton or open form as shown, to reduce weight. Stampings of this kind are inexpensively made and finished. The flange of the operating lever not only provides a housing for the biasing spring and stops to limit the movement, but serves also to strengthen the structure and make it less susceptible to bending under severe service and abuse.

Lever supporting bracket 31 is secured to the frame section of the handle by bending the same into a loop 38 about the base or yoke 22 thereof as most clearly shown in Fig. 2. Thus the base of bracket 31 lies in front of yoke 22, is then bent around one edge thereof, next lies against the back of yoke 22 and finally is bent or crimped down upon the opposite edge thereof. The anchorage of the bracket to the frame section may be further strengthened and made more permanent by soldering or welding together the overlapping parts. This construction provides a thick, strong, and substantial seat or base block for the attachment of grip 18 as will be hereinafter described. The operating lever bracket also serves as a stop or abutment against which the operator's hand can rest and push, especially when forcing the bowl into the ice cream. This abutment makes it easier for the operator to force the bowl of the disher into relatively hard and solid materials such as hard ice cream.

The parallel relation of the pivot of the operating lever and the scraper driving shaft eliminates the tendency of the lever to skew or be warped from its normal position when under heavy load. Such skewing or warping would interfere with the proper meshing of the rack and pinion teeth as has been found to be the case where the lever and shaft axes are at right angles. It also makes assembly easy.

Grip 18, which may be made of wood or other suitable material, has a metal stud 39 rigidly imbedded in and projecting from the front end thereof. The forward end of the stud 39 is provided with a cylindrical recess 40 into which the rear reduced end of shaft 27 is journaled. By externally threading the stud 39 throughout its length, one end may be screwed into the wooden grip to anchor the same thereto, and the other end may be screwed into a threaded hole provided in the base block formed by bracket loop 38 and frame yoke 22 so as to anchor the two sections of the handle together. This arrangement makes a strong and compact structure because the shaft bearing and grip anchoring stud are telescoped and the mounting space required therefor is reduced. A metal nipple or ferrule 41 may be applied to the end of the grip to protect the same against splitting and give it a finished appearance. In assembling the grip to the frame section of the handle, stud 39, which ordinarily will be firmly imbedded in the grip, has the reduced end of shaft 27 inserted therein and is then screwed into place in the base block of the frame. The parts may be so related that the end of stud 39 will co-operate with the shoulder at the enlargement of shaft 27 to prevent excessive end play of the operating shaft. The normal thrust exerted upon the shaft by the scraper, which ordinarily possesses considerable resiliency, will tend to keep the shoulder end of shaft 27 against the end of stud 39 and will thereby maintain the rear end of shaft 27 in its bearing in stud 39 and prevent rattling of the parts.

The modified construction illustrated in Figs. 6 to 10 includes in general a bowl 50, a scraper 51, a two-section handle comprising a frame 52 and a grip 53, and an operating lever 54. Scraper 51 is provided with a rivet 55 in its outer end which is journaled in a hole in the bowl as previously explained. The inner end of scraper 51 is secured to an operating shaft 56 in any desired and approved manner.

Frame 52 is formed from a tube of suitable material such as brass or steel. Its forward end is enlarged and provided with a flange 57 which embraces the bowl and is secured thereto by solder, welding or rivets, as desired. The rear end of frame 52 has a substantially U-shaped bracket 58 rigidly attached thereto. One leg 59 of bracket 58 is extended to provide a stop or abutment for the operator's hand and to furnish a mounting for operating lever 54. Operating lever 54 which is of substantially triangular shape and provided with a curved rack 60, has a boss or bearing lug 61 projecting therefrom. It is formed with a flange 62 which on one side is enlarged and extended to form a thumb piece 63. Boss 61 extends through a hole in leg 59 so that it forms a pivot on which the operating lever oscillates. It is held in place by a washer 64 and a cap screw 65 which threads into its end. A biasing spring 66 encircles stud 61 and has one leg 67 lying along and in engagement with flange 62 of the operating lever. The other leg 68 of the spring abuts a fixed post 69 which is carried by leg 59 of bracket 58. Thus the movement of the operating lever in one direction by the operator tensions the biasing spring so that it will return the lever when the same is released. Post 69 extends through a curved slot 70 in the face of operating lever 54 and thus also serves as a stop for limiting the movement of the operating lever.

A pinion 71 is rigidly secured to the inner end of shaft 56 in a position to mesh with the teeth of rack 60. Consequently the movements of operating lever 54 are imparted to the shaft and scraper.

Bracket 58 has a lug or boss 72 projecting rearwardly therefrom. This boss is internally threaded for receiving a grip holding screw 73. Grip 53 has a bore therethrough for the passage of screw 73, the forward end being enlarged to accommodate lug 72, so that when the screw is tightened it holds the grip firmly in place.

The modified construction of the disher has many characteristics and structural features in common with the preferred construction. The operating shaft and its pinion are well protected against injury. The axes of the operating shaft and operating lever lie parallel to each other with the advantages which heretofore have been pointed out for such an arrangement. The operating lever may be stamped from sheet metal and it is adapted to house and shield the biasing spring. The biasing spring is long and of the leaf variety and possesses the merit heretofore attributed to this type of spring.

Figure 11 is a detail perspective view of an improved construction for obtaining a strong and durable connection or joint between the scraper and its operating shaft. Heretofore considerable difficulty has been experienced and breakage of the joint or of the scraper at or in the vicinity of the joint has been a source of annoyance. In the improved construction, an enlarged tubular head 75 is pressed upon and secured to the end of an operating shaft 27'—56' by solder or other suitable means. The end of head 75 has slots 76 cut in its front face for receiving the reduced end 77 of scraper 16'—51'. The depth of slots 76 is made slightly greater than the thickness of the reduced scraper 77 so that when end 77 is placed in the slots the projecting portions 78 on the head may be riveted over to overlap the back of the reduced end of the scraper to hold the same in place as most clearly shown in Figures 1, 2, and 6. After being thus assembled, the scraper and head may be further anchored together by suitable means, such as solder. This construction affords a strong, rigid and durable joint. The load is not borne to any great extent by the solder and there are no sharp bends in the scraper so that separation and breakage is prevented.

Having thus illustrated and described my invention, what I claim as new and desire to secure by Letters Patent of the United States is:

1. A disher comprising a bowl, a scraper movably mounted therein, a handle secured to the bowl, a substantially flat bracket projecting from the handle, an operating shaft for the scraper extending along the handle, an operating lever pivoted to the bracket on an axis parallel to the shaft, and connections between the operating lever and the shaft whereby actuation of the lever rotates the shaft.

2. A disher comprising a bowl, a scraper movably mounted therein, a handle secured to the bowl, an operating shaft attached to the scraper and lying along and protected by the handle, a substantially flat bracket projecting from the handle and serving as an abutment for the operator's hand, an operating lever pivotally carried by the bracket on an axis parallel to the shaft, and operative connections for communicating the motion of the operating lever to the shaft.

3. An ice cream disher comprising a bowl, a handle rigidly attached thereto, a movable scraper within the bowl, a shaft and pinion adjacent the handle and protected thereby and attached to the scraper, a substantially flat bracket projecting laterally from the handle to offer an abutment against which an operator's hand may push, an operating lever carried by the bracket to oscillate about an axis parallel to the shaft, and having a rack for operatively engaging the pinion.

4. An ice cream disher comprising an elongated handle, a bowl secured thereto, a pivoted scraper for clearing the bowl of its contents, a shaft passing through the bowl and attached to the scraper to move the same, a pinion rigidly attached to the shaft, a bracket projecting laterally from the handle to serve as a guard and abutment for the operator's hand, an operating lever provided with a rack engaging the pinion and pivotally supported by the bracket on an axis parallel to the operating shaft, and a spring biasing the lever in one direction to return the same after it has been moved in the opposite direction by the operator and released.

5. An ice cream disher comprising a bowl; a movable scraper therein; an operating shaft for the scraper; a handle for the bowl including a pair of substantially parallel legs for attachment to the bowl and accommodation of the shaft therebetween, and an interconnecting yoke; a bracket looped about the yoke and projecting laterally of the handle; an operating lever pivotally mounted on the bracket; driving connections between the lever and the shaft; and a spring for biasing the moving elements to a normal position.

6. An ice cream disher having a bowl; a movable scraper therein; a shaft for moving the scraper; a handle for the bowl including a frame having two substantially parallel legs and an interconnecting yoke, and a grip having a recessed stud for attaching the same to the yoke of the frame and providing a bearing for the shaft, said legs being attached to the bowl; a bracket rigidly secured to the handle; and an operating lever for the shaft pivotally carried by the bracket.

7. An ice cream disher comprising a two-section handle, one section comprising a metal frame having two substantially parallel legs and an interconnecting yoke and the other section comprising a hand grip with a recessed and externally threaded stud projecting from one end thereof, a bowl attached to the legs of the frame, a scraper pivotally mounted within the bowl, a shaft for moving the scraper, and having one end journaled in the recess of the stud, a pinion mounted on the shaft, said shaft and pinion lying between the legs of the frame, a bracket projecting laterally from the handle and having one end looped about the yoke of the frame to anchor the same in place and form a base into which the stud of the grip may thread, an operating lever pivotally attached to the bracket with its axis parallel to the shaft and having rack teeth for engaging the pinion, and a spring for returning the lever and other moving elements to normal position after they have been moved therefrom by the operator.

8. Elements for an ice cream disher including in combination a handle; and a bracket to which an operating lever may be attached, said handle comprising a single piece metal frame of two substantially parallel bowl attaching legs with an interconnecting yoke and a grip with a stud projecting therefrom, said bracket being looped about the yoke of the frame to hold the same in place and to provide a block into which the stud of the grip may be threaded.

9. Elements for an ice cream disher including in combination a handle; and a bracket to which an operating lever may be attached and which serves as an abutment for an operator's hand, said handle being formed of two separable sections, one section comprising a substantially U-shaped frame of two bowl attaching legs and an interconnecting yoke, the other section comprising a hand grip having a threaded projecting stud for attaching the same at the yoke, said bracket projecting laterally from the frame and being attached to the yoke thereof.

10. In an ice cream disher, a bowl, a scraper in the bowl, an open frame in the form of a metal strap bent to provide a pair of spaced legs connected at corresponding ends by an integral web, the other ends of said legs being anchored to the bowl, said legs being disposed edgewise to the plane of the margin of the bowl opening, a scraper operating shaft, said shaft being journaled at one end in the bowl and extending laterally therefrom in the space between the frame legs, said shaft lying wholly between the upper and lower margins of the frame legs, a handle, a hollow stem threaded into the frame web by which the handle is attached to the frame, said hollow stem constituting a bearing for the contiguous end of the scraper shaft.

In witness whereof, I hereunto subscribe my name this 6th day of June, 1925.

HARRISON D. FLEGEL.